United States Patent
Rasanen

(10) Patent No.: US 10,397,009 B2
(45) Date of Patent: Aug. 27, 2019

(54) MANAGEMENT AND CONTROL OF APPLICATION BASED CHARGING

(75) Inventor: Juha Antero Rasanen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 101 days.

(21) Appl. No.: 14/411,172

(22) PCT Filed: Jun. 29, 2012

(86) PCT No.: PCT/EP2012/062696
§ 371 (c)(1),
(2), (4) Date: Dec. 24, 2014

(87) PCT Pub. No.: WO2014/000812
PCT Pub. Date: Jan. 3, 2014

(65) Prior Publication Data
US 2015/0146578 A1    May 28, 2015

(51) Int. Cl.
*H04L 12/14* (2006.01)
*H04M 15/00* (2006.01)
*H04W 4/24* (2018.01)
*H04L 12/26* (2006.01)

(52) U.S. Cl.
CPC ........ *H04L 12/1407* (2013.01); *H04L 43/028* (2013.01); *H04M 15/66* (2013.01); *H04M 15/82* (2013.01); *H04M 15/83* (2013.01); *H04W 4/24* (2013.01)

(58) Field of Classification Search
None
See application file for complete search history.

(56) References Cited

U.S. PATENT DOCUMENTS

| | | | | |
|---|---|---|---|---|
| 8,880,023 | B2* | 11/2014 | Goldner | H04L 12/1407 455/406 |
| 2012/0182868 | A1* | 7/2012 | Lovsen | H04L 47/263 370/230 |
| 2012/0220330 | A1* | 8/2012 | Goldner | H04L 12/1407 455/517 |

(Continued)

FOREIGN PATENT DOCUMENTS

| CN | 102137367 A | 7/2011 |
|---|---|---|
| WO | 2012/077073 A1 | 6/2012 |

OTHER PUBLICATIONS

International Search Report and Written Opinion dated Apr. 4, 2013 corresponding to International Patent Application No. PCT/EP2012/062696.

(Continued)

*Primary Examiner* — Jason E Mattis
*Assistant Examiner* — Hong Shao
(74) *Attorney, Agent, or Firm* — Squire Patton Boggs (US) LLP

(57) ABSTRACT

It is provided an apparatus, comprising generating means adapted to generate detection charging information related to an application; informing means adapted to inform a rules function device about a detection charging capability, wherein the detection charging capability indicates that the apparatus comprises the generating means; detecting means adapted to detect a start of the application; indicating means adapted to indicate the start of the application to the rules function device.

17 Claims, 5 Drawing Sheets

(56) References Cited

U.S. PATENT DOCUMENTS

2012/0239816 A1* 9/2012 Carnero Ros .......... H04M 15/66
709/227

OTHER PUBLICATIONS

Allot Communications et al., "New WID: Study on Application Based Charging," 3GPP Draft, S2-122533, vol. SA WG2 Meeting #91, Kyoto, Japan, May 25, 2012, XP050633019, 5 pages.
Ericsson et al., "Details on Alternative 1a of Key Issue Service Awareness and Privacy Policies," 3GPP Draft; S2-102173_PCR_23813_Service_Awareness, 3GPP TSG SA WG2 Meeting #79, May 10-14, 2010, Kyoto, Japan, XP050434388, 9 pages.
Ericsson et al., "Details on Alternative 1a of Key Issue Service Awareness and Privacy Policies," 3GPP Draft; S2-103633_PCR_23813_Service_Awareness_RX_Based_Solution, 3GPP TSG SA WG2 Meeting #80, Aug. 30-Sep. 2, 2010, Brunstad, Norway, XP050458648, 9 pages.
"Service Awareness and Privacy Policies," 3GPP Draft, S2-105222, vol. SA WG2, Prague, Oct. 14, 2010, XP050522611, 5 pages.

3GPP TS 23.203 V11.5.0 (Mar. 2012) "3rd Generation Partnership Project; Technical Specification Group Services and System Aspects; Policy and charging control architecture (Release 11)"; pp. 1-175; 3rd Generation Partnership Project (3GPP); Mobile Competence Centre; 650, Route des Lucioles; F-06921 Sophia-Antipolis Cedex; France.
3GPP TS 29.212 V11.4.0 (Mar. 2012) "3rd Generation Partnership Project; Technical Specification Group Core Network and Terminals; Policy and Charging Control (PCC) over Gx/Sd reference point"; pp. 1-181; 3rd Generation Partnership Project (3GPP); Mobile Competence Centre; 650, Route des Lucioles; F-06921 Sophia-Antipolis Cedex; France.
Chinese Office Action and its English language translation dated Jul. 31, 2017, issued in CN corresponding Application No. 201280075476.0.
Allot Communiations et al., "Application Based Charging Considerations", 3GPP SA WG2 Temporary Document, Meeting #91, S2-122027 Revision of S2-12XXXX, Kyoto, Japan, May 2012. 4 pages.

* cited by examiner

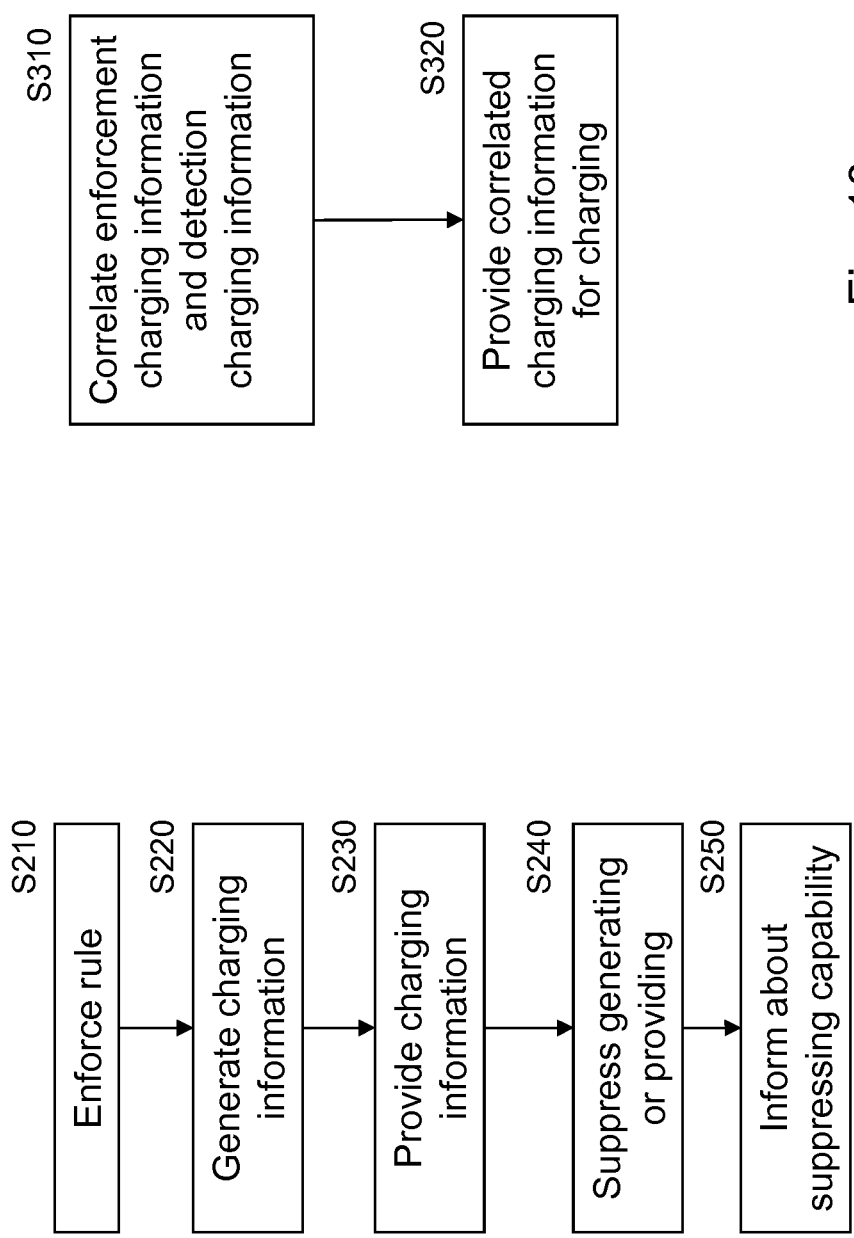

MANAGEMENT AND CONTROL OF APPLICATION BASED CHARGING

FIELD OF THE INVENTION

The present invention relates to an apparatus, a method, a system, and a computer program product related to policy control and charging. More particularly, the present invention relates to an apparatus, a method, a system, and a computer program product for policy control and charging for application based charging.

BACKGROUND OF THE INVENTION

Abbreviations
3GPP 3$^{rd}$ generation partnership project
ADC Application detection and control
AF Application Function
BBERF Bearer Binding and Event Reporting Function
CC Charging control
CN Core Network
GW Gateway
ID Identity, Identifier
IMSI International mobile subscriber identity
IP Internet protocol
IP-CAN IP connectivity access network
OCS Online charging system
OFCS Offline charging system
PCC Policy and charging control
PCEF Policy and charging enforcement function
PCRF Policy and charging rules function
P-GW Packet data network gateway
QoS Quality of service
Rel Release
SA Service Architecture (group)
SDF Service data flow
SPR Subscription profile repository
TDF Traffic detection function
TR Technical report
TS Technical Specification
UDR User data repository
UE User equipment 3GPP SA2 has recently approved a work item "Study on Application Based Charging", refer to 3GPP S2-122533. 3GPP has also other traffic detection and charging related work going on within the area of fixed broadband interworking, refer e.g. to the 3GPP SA2#91 meeting report. The study concentrates on "PCEF and/or TDF based charging solutions" with a requirement of "Charging for services and applications when TDF performs application detection and control for IP-CAN session's traffic". In practice an essential issue and objective for many companies is to specify how a standalone TDF can perform/support application based charging.

According to 3GPP TS 23.203 v 11.5.0, the TDF is a functional entity that performs application detection and reporting of detected application and its service data flow description to the PCRF.

For those cases where service data flow description is not possible to be provided by the TDF to the PCRF, the TDF performs:
   Gating;
   Redirection;
   Bandwidth limitation.
for the detected applications.

For those cases where service data flow description is provided by the TDF to the PCRF the actions resulting of application detection may be performed by the PCEF as part of the charging and policy enforcement per service data flow and by the BBERF for bearer binding as defined in 3GPP TS 23.203 v 11.5.0 or may be performed by the TDF.

For the purposes of this specification, it is sufficient that the TDF performs at least detection of a start of an application.

FIG. 1 shows how the TDF conventionally may be embedded in the PCC logical architecture. In detail, the TDF is connected via the Sd interface to the PDRF. The PCRF has a central role in the PCC architecture and is connected to the PCEF via Gx interface. Typically, the PCEF is embedded in a gateway function. Furthermore, the PCRF and the PCEF may be connected to an OCS. The PCEF may be additionally connected to an OFCS.

Further details are provided in 3GPP TS 29.212.

SUMMARY OF THE INVENTION

It is an object of the present invention to improve the prior art.

According to a first aspect of the invention, there is provided an apparatus, comprising generating means adapted to generate detection charging information related to an application; informing means adapted to inform a rules function device about a detection charging capability, wherein the detection charging capability indicates that the apparatus comprises the generating means; detecting means adapted to detect a start of the application; indicating means adapted to indicate the start of the application to the rules function device.

The apparatus may further comprise providing means adapted to provide the detection charging information to a charging device; checking means adapted to check if an enforcement charging capability received from the rules function device indicates that an enforcement function prevents the generating and/or providing of enforcement charging information, wherein the enforcement charging information corresponds to the detection charging information; hinting means adapted to give, if the checking by the checking means is not affirmative, a hint to the charging device that the charging device may receive the enforcement charging information and the detection charging information.

In the apparatus, the generating means may be adapted to include, in the detection charging information, a session information received from the rules function device with respect to the application.

According to a second aspect of the invention, there is provided an apparatus, comprising generating processor adapted to generate detection charging information related to an application; informing processor adapted to inform a rules function device about a detection charging capability, wherein the detection charging capability indicates that the apparatus comprises the generating processor; detecting processor adapted to detect a start of the application; indicating processor adapted to indicate the start of the application to the rules function device.

The apparatus may further comprise providing processor adapted to provide the detection charging information to a charging device; checking processor adapted to check if an enforcement charging capability received from the rules function device indicates that an enforcement function prevents the generating and/or providing of enforcement charging information, wherein the enforcement charging information corresponds to the detection charging information; hinting processor adapted to give, if the checking by the checking processor is not affirmative, a hint to the charging device that the charging device may receive the enforcement charging information and the detection charging information.

In the apparatus, the generating processor may be adapted to include, in the detection charging information, a session information received from the rules function device with respect to the application.

According to a third aspect of the invention, there is provided an apparatus, comprising detecting means adapted to detect if a start indication is received from a detection device, wherein the start indication indicates that an application is started; creating means adapted to create, if it is detected that the start indication is received, a rule related to charging of the application; rule providing means adapted to provide the rule to an enforcement device different from the detection device; informing means adapted to inform the enforcement device about a detection charging capability of the detection device and/or to inform the detection device about an enforcement charging capability of the enforcement device, wherein an information of the detection charging capability is received from the detection device and an information of the enforcement charging capability is received from the enforcement device, and the enforcement charging information and the detection charging information are related to the application and correspond to each other.

The apparatus may further comprise checking means adapted to check if the following two conditions are fulfilled: a) the enforcement charging capability indicates that the enforcement device supports preventing a generating and/or providing of the enforcement charging information, and b) the detection charging capability indicates that the generating of the detection charging information is supported by the detection device; wherein at least one of the creating means is adapted to create, if the checking by the checking is affirmative, the rule such that the rule comprises an indication that the detection device creates the detection charging information; and the apparatus comprises distributing means adapted to distribute, to the detection device, if the checking by the checking means is not affirmative, a charging relevant information comprised in the rule.

The apparatus may further comprise reporting means adapted to report, to the detection device, a session on which the application is based.

According to a fourth aspect of the invention, there is provided an apparatus, comprising detecting processor adapted to detect if a start indication is received from a detection device, wherein the start indication indicates that an application is started; creating processor adapted to create, if it is detected that the start indication is received, a rule related to charging of the application; rule providing processor adapted to provide the rule to an enforcement device different from the detection device; informing processor adapted to inform the enforcement device about a detection charging capability of the detection device and/or to inform the detection device about an enforcement charging capability of the enforcement device, wherein an information of the detection charging capability is received from the detection device and an information of the enforcement charging capability is received from the enforcement device, and the enforcement charging information and the detection charging information are related to the application and correspond to each other.

The apparatus may further comprise checking processor adapted to check if the following two conditions are fulfilled: a) the enforcement charging capability indicates that the enforcement device supports preventing a generating and/or providing of the enforcement charging information, and b) the detection charging capability indicates that the generating of the detection charging information is supported by the detection device; wherein at least one of the creating processor is adapted to create, if the checking by the checking is affirmative, the rule such that the rule comprises an indication that the detection device creates the detection charging information; and the apparatus comprises distributing processor adapted to distribute, to the detection device, if the checking by the checking processor is not affirmative, a charging relevant information comprised in the rule.

The apparatus may further comprise reporting processor adapted to report, to the detection device, a session on which the application is based.

According to a fifth aspect of the invention, there is provided an apparatus, comprising enforcing means adapted to enforce a rule received from a rules function device upon an application; generating means adapted to generate enforcement charging information related to the application; providing means adapted to provide the enforcement charging information to a charging device; preventing means adapted to prevent at least one of the generating means from generating the enforcement charging information and the providing means from providing the enforcement charging information; informing means adapted to inform the rules function device about an enforcement charging capability, wherein the enforcement charging capability indicates that the apparatus comprises the preventing means.

The apparatus may further comprise checking means adapted to check if the rules function device provides an indication that a detection device generates detection charging information corresponding to the enforcement charging information; wherein the preventing means may be adapted to prevent the at least one of the generating means and the providing means from generating and providing, respectively, if the checking by the checking means is affirmative.

In the apparatus, the checking means may be adapted to check if the rule comprises the indication.

According to a sixth aspect of the invention, there is provided an apparatus, comprising enforcing processor adapted to enforce a rule received from a rules function device upon an application; generating processor adapted to generate enforcement charging information related to the application; providing processor adapted to provide the enforcement charging information to a charging device; preventing processor adapted to prevent at least one of the generating processor from generating the enforcement charging information and the providing processor from providing the enforcement charging information; informing processor adapted to inform the rules function device about an enforcement charging capability, wherein the enforcement charging capability indicates that the apparatus comprises the preventing processor.

The apparatus may further comprise checking processor adapted to check if the rules function device provides an indication that a detection device generates detection charging information corresponding to the enforcement charging information; wherein the preventing processor may be adapted to prevent the at least one of the generating processor and the providing processor from generating and providing, respectively, if the checking by the checking processor is affirmative.

In the apparatus, the checking processor may be adapted to check if the rule comprises the indication.

According to a seventh aspect of the invention, there is provided an apparatus, comprising correlating means adapted to correlate an enforcement charging information received from an enforcement device and a detection charging information received from a detection device different from the enforcement device to obtain a correlated charging information, wherein the enforcement charging information and the detection charging information are both related to an application; a hint received from the detection device is used in the correlating; and the hint indicates if the enforcement charging information corresponds to the detection charging information; and providing means adapted to provide the correlated charging information for charging the application.

According to an eighth aspect of the invention, there is provided an apparatus, comprising correlating processor adapted to correlate an enforcement charging information received from an enforcement device and a detection charging information received from a detection device different from the enforcement device to obtain a correlated charging information, wherein the enforcement charging information and the detection charging information are both related to an application; a hint received from the detection device is used in the correlating; and the hint indicates if the enforcement charging information corresponds to the detection charging information; and providing processor adapted to provide the correlated charging information for charging the application.

According to a ninth aspect of the invention, there is provided a method, comprising informing a rules function device about a detection charging capability, wherein the detection charging capability indicates a capability of application based charging of an application; detecting a start of the application; generating detection charging information related to the application; indicating the start of the application to the rules function device.

The method may further comprise providing the detection charging information to a charging device; checking if an enforcement charging capability received from the rules function device indicates that an enforcement function prevents the generating and/or providing of enforcement charging information, wherein the enforcement charging information corresponds to the detection charging information; giving, if the checking is not affirmative, a hint to the charging device that the charging device may receive the enforcement charging information and the detection charging information.

In the method, the generating may be adapted to include, in the detection charging information, a session information received from the rules function device with respect to the application.

According to a tenth aspect of the invention, there is provided a method, comprising detecting if a start indication is received from a detection device, wherein the start indication indicates that an application is started; creating, if it is detected that the start indication is received, a rule related to charging of the application; providing the rule to an enforcement device different from the detection device; informing the enforcement device about a detection charging capability of the detection device and/or informing the detection device about an enforcement charging capability of the enforcement device, wherein an information of the detection charging capability is received from the detection device and an information of the enforcement charging capability is received from the enforcement device, and the enforcement charging information and the detection charging information are related to the application and correspond to each other.

The method may further comprise checking if the following two conditions are fulfilled: a) the enforcement charging capability indicates that the enforcement device supports preventing a generating and/or providing of the enforcement charging information, and b) the detection charging capability indicates that the generating of the detection charging information is supported by the detection device; wherein at least one of the rule is created, if the checking by the checking is affirmative, such that the rule comprises an indication that the detection device creates the detection charging information; and the method comprises distributing, to the detection device if the checking is not affirmative, a charging relevant information comprised in the rule.

The method may further comprise reporting, to the detection device, a session on which the application is based.

According to an eleventh aspect of the invention, there is provided a method, comprising enforcing a rule received from a rules function device upon an application; generating enforcement charging information related to the application; providing the enforcement charging information to a charging device; preventing at least one of the generating of the enforcement charging information and the providing of the enforcement charging information; informing the rules function device about an enforcement charging capability, wherein the enforcement charging capability indicates a capability of the preventing.

The method may further comprise checking if the rules function device provides an indication that a detection device generates detection charging information corresponding to the enforcement charging information; wherein the at least one of the providing of the enforcement charging information and the generating of the enforcement charging information may be prevented if the checking is affirmative.

In the method, the checking may comprise checking if the rule comprises the indication.

According to a twelfth aspect of the invention, there is provided a method, comprising correlating an enforcement charging information received from an enforcement device and a detection charging information received from a detection device different from the enforcement device to obtain a correlated charging information, wherein the enforcement charging information and the detection charging information are both related to an application; a hint received from the detection device is used in the correlating; and the hint indicates if the enforcement charging information corresponds to the detection charging information; and providing the correlated charging information for charging the application.

Each of the methods according to the ninth to twelfth aspects may be a method of application based charging.

According to a thirteenth aspect of the invention, there is provided a computer program product comprising a set of instructions which, when executed on an apparatus, is configured to cause the apparatus to carry out the method according to any one of the ninth to twelfth aspects.

The computer program product may be embodied as a computer-readable medium.

According to embodiments of the invention, at least the following advantages are achieved:

The TDF may be enabled to create charging information/reports including a correlation to the corresponding session(s) and/or user and/or UE. Thus, the TDF may generate charging information/reports in a standard format which may be used by conventional charging systems.

Overlapping charging information/reporting may be avoided. Thus, a risk of double charging or failure of operation in the charging system is reduced. Furthermore, processing load in the entities and signaling load on the interfaces is reduced.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein

FIG. 8 shows a method according to an embodiment of the invention;

FIG. 10 shows a method according to an embodiment of the invention.

DETAILED DESCRIPTION OF CERTAIN EMBODIMENTS

Figure 1:
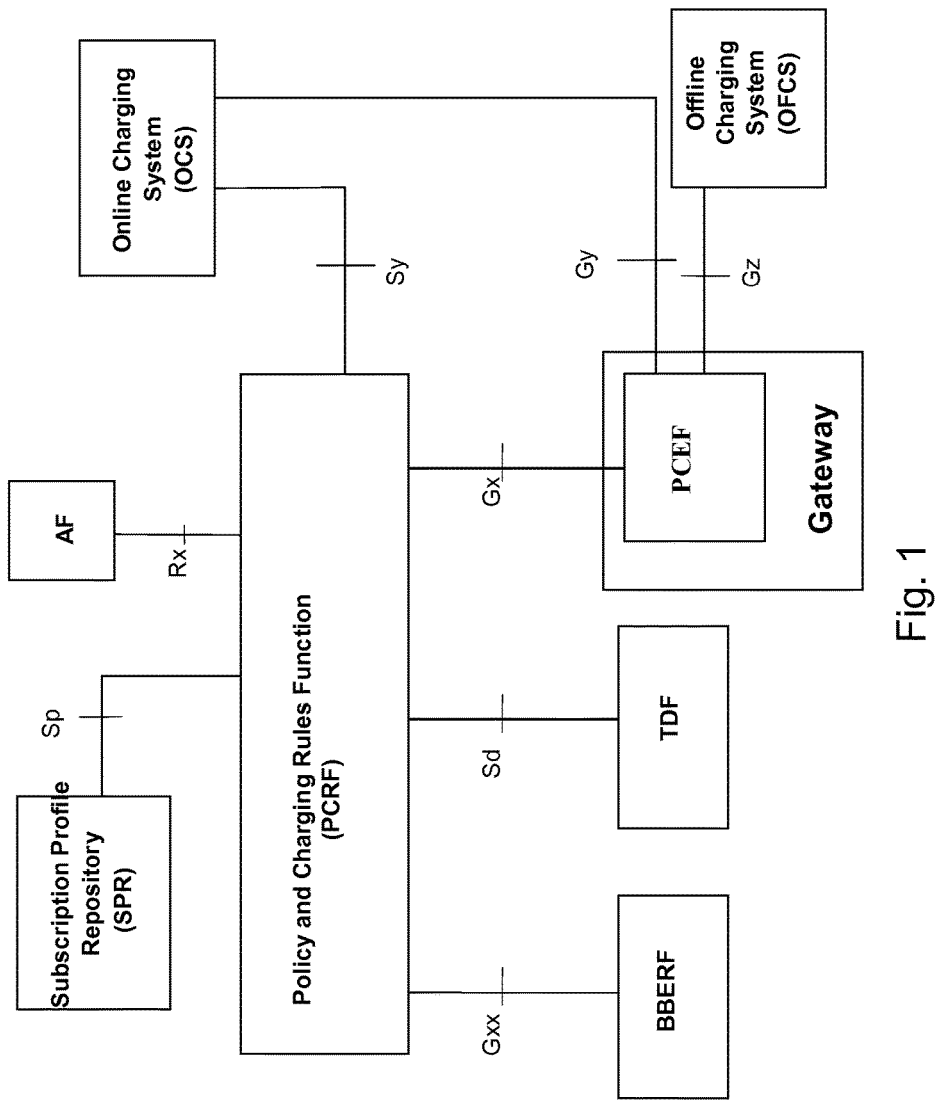
FIG. 1 shows a PCC logical architecture according to 3GPP TS 23.203 v 11.5.0.

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

With a conventional TDF involved in the application based charging, at least the following problems may occur:

A conventional standalone TDF is not aware of IP-CAN sessions and IP-CAN session related parameters. TDF may have several control sessions with a PCRF (and in a similar way with an OCS or another charging entity such as an OFCS), one control session per IPv4 address of the UE and one control session per (each) IPv6 prefix (as per the prior art 3GPP TS 29.212), without being able to correlate/bind these sessions with each other or with the user/UE. So a conventional standalone TDF is not able to create per user charging information, nor to create charging information/reports with standard format and parameters understood and used by current charging systems.

There will be overlapping charging related functionalities and reporting towards the charging system in TDF and PCEF, and consequently, a risk of double charging or failure of operation within the charging system. Moreover, such overlapping functionalities may increase processing load in related entities and signalling load at interfaces.

According to embodiments of the invention, related network entities may exchange capability indications to find out to which extent the TDF resided application based charging functionalities are supported and accounted for by each entity. For example, related network entities may indicate their possible capability to support application based charging operations/measures at the TDF e.g. upon an IP-CAN session establishment. Related entities may include PCEF, TDF, PCRF and OCS, wherein "PCRF" or "OCS" may actually comprise an integrated PCRF+OCS or stand-alone PCRF and OCS. PCRF may be aware of the support of application based charging at the charging system (OCS, OFCS, etc.), e.g. through configuration or through prior information exchange between the entities. An exemplary indication mechanism upon PCC interfaces is available in current 3GPP PCC specifications, known as "supported features negotiation".

According to embodiments of the invention, at least one of PCEF, PCRF and (standalone) Traffic Detection Function (TDF)/Application Detection and Control (ADC), and charging system may be enhanced with some further control as described below. The ADC is integrated with the PCEF and may report start and stop of an application to the PCRF, similarly to the TDF (see 3GPP TS 23.203 v11.5.0, section 6.2.2.5).

Exemplarily, PCEF may be enhanced with some further control to restrain from sending charging information/records for services detected and handled by TDF, as described below. Alternatively, according to another example, PCEF may not be enhanced, but then the charging system may be enhanced to detect the overlapping charging information sent by PCEF and TDF for services detected and handled by TDF.

Figure 2:
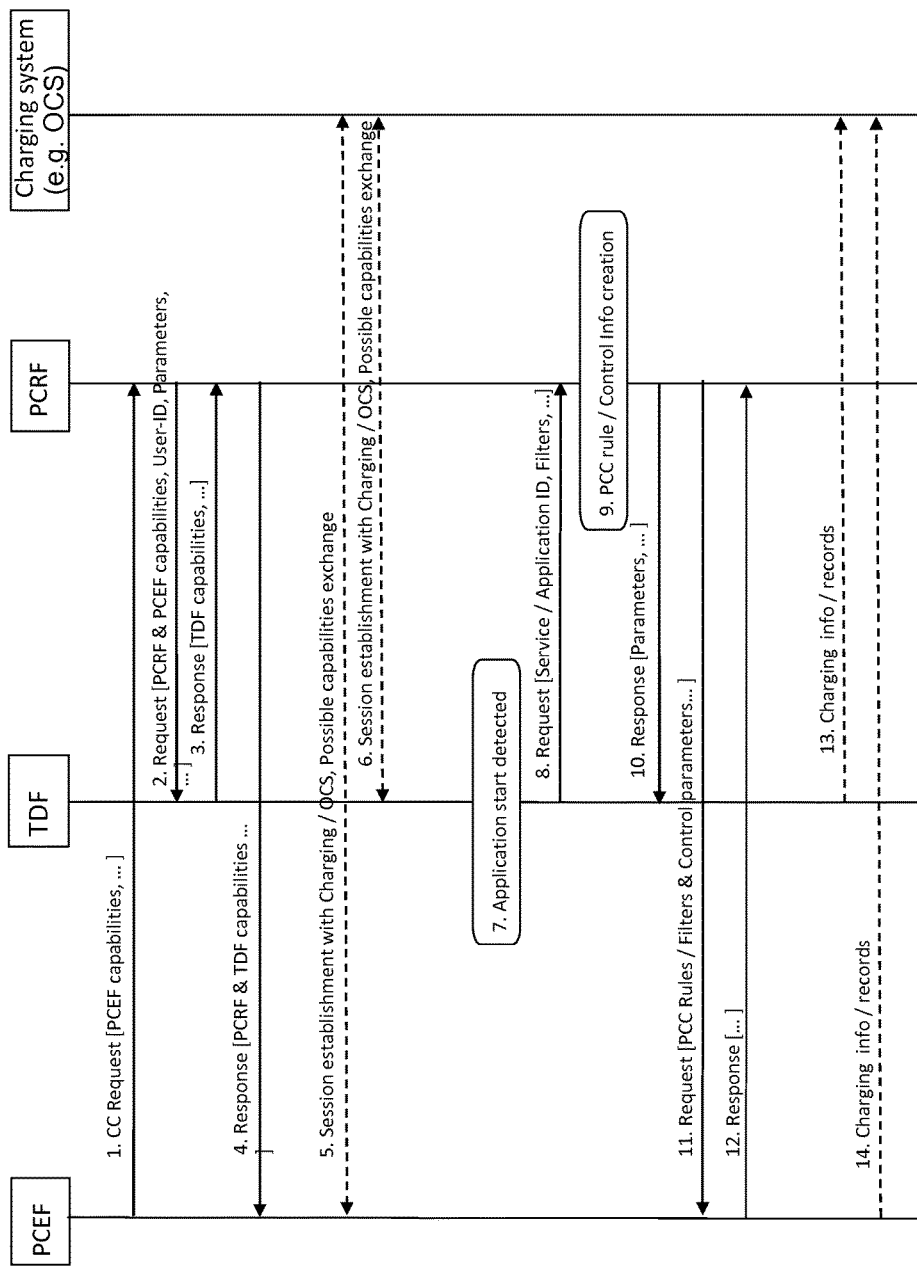
FIG. 2 shows a message flow according to an embodiment of the invention.

FIG. 2 shows an exemplary message flow according to an embodiment of the invention:

PCEF indicates its support (i.e., its capability with respect to application based charging by the TDF, that is, its capability to suppress the generation and/or providing of charging information/records insofar as it is is supported by the TDF) to PCRF. For example, PCEF may indicate its support within a request message sent to PCRF upon an IP-CAN session establishment to set up a Gx control session, step 1.

PCRF indicates PCEF's support to TDF within a request message sent to TDF to establish a TDF control session, step 2. In addition, it may indicate its own support to TDF.

TDF indicates its support to PCRF within a response message, step 3.

PCRF indicates TDF's support to PCEF within a response message, step 4. In addition, it may indicate its own support to PCEF.

Optionally, in addition to currently standardized ADC rules, PCRF may send IP-CAN session related parameters, e.g. the user identity/User-ID (e.g. IMSI), to TDF. TDF may include such relevant parameters in the charging information/record message sent to the charging system (OCS or OFCS), to enable/make it easier for the charging system to bind the information from possibly several different TDF-PCRF sessions with each other and with the correct Gx session and user. Furthermore, knowledge of the IP-CAN session related parameters may enable creation of charging information/records by TDF with a standard content and format.

If PCRF and the charging system are separate entities, control sessions are established also between PCEF and the charging system and between the charging system and TDF, steps 5 and 6 in FIG. 2. A capability indication may be applied here, too (which may be omitted e.g. if the indication by PCRF covers also the charging system). This means that if the charging system does not indicate to support the application based charging feature, TDF shall ignore related information received from PCRF and shall restrain from any related actions.

According to some embodiments of the invention, actions to support charging control may be as follows, when TDF detects the start of an application. In the present exemplary embodiment, it is supposed that PCEF had earlier, e.g. upon IP-CAN session establishment, indicated to support the "application based charging by TDF" feature.

When detecting the start of an application, step 7 in FIG. 2, TDF sends a start indication with traffic mapping/filter information to PCRF, step 8 in FIG. 2. PCRF sends a PCC Rule/PCC Rules and/or control information to PCEF (including the traffic mapping/filter information) which indicates that the TDF creates charging information/records for this detected service towards the charging system, steps 9 and 11 in FIG. 2.

PCEF may then restrain from producing the same charging information/records towards the charging system, i.e. exclude traffic that corresponds to the traffic mapping information/filters received from TDF via PCRF from the generation of charging information/records.

According to another exemplary embodiment, PCEF may not have sent an indication to support application based charging by TDF or may have sent an indication that it does not support the feature.

In this case, in its response to TDF, step 10 in FIG. 2, PCRF may send parameters related to the PCC rule(s) created for the detected service which the PCRF sent to PCEF. Since the PCEF in the present exemplary embodiment does not support the "application based charging by TDF" feature, the charging information/records sent by PCEF contain also the traffic detected and reported by TDF. Then, TDF may send a/the parameter/parameters to the charging system, e.g. within a charging information/record, step 13 in FIG. 2 or in a separate message. Thus, TDF helps the charging system to identify information/records possibly sent by both PCEF and TDF, and thus avoid double charging. That is, the charging system may use the parameter in the correlation procedure of the charging information/records received from PCEF and TDF. E.g., it may delete one instance of the "doubled" charging information/records.

Otherwise, according to some embodiments, the creation and sending routines of charging information/records by PCEF and TDF to the charging system (steps 13 and 14 in FIG. 1) may be not affected by the above described control mechanism and as such, those routines are out of the scope of this document.

Figure 3:
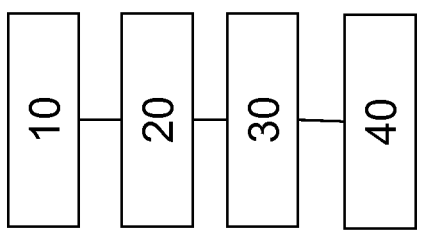
FIG. 3 shows an apparatus according to an embodiment of the invention.
Figure 4:
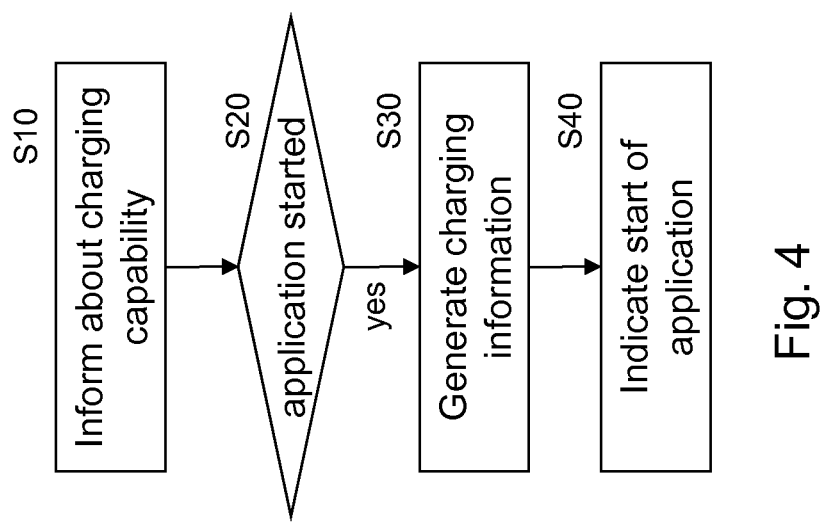
FIG. 4 shows a method according to an embodiment of the invention.

FIG. 3 shows an apparatus according to an embodiment of the invention. The apparatus may be a traffic detection function such as a TDF. FIG. 4 shows a method according to an embodiment of the invention. The apparatus according to FIG. 3 may perform the method of FIG. 4 but is not limited to this method. The method of FIG. 4 may be performed by the apparatus of FIG. 3 but is not limited to being performed by this apparatus.

The apparatus comprises informing means 10, detecting means 20, generating means 30, and indicating means 40.

The informing means 10 informs a rules function such as a PCRF about its charging capability, i.e. its capability to generate application based charging information/records for the application (S10). For example, this indication may mean that the apparatus comprises a generating means 30. If the detecting means 20 detects that the application is started (S20), the generating means 30 may generate charging information/records related to the application (S30), and the indicating means 40 may indicate the start of the application to the rules function (S40). For example, the charging information may be related to the start and/or the stop of the application.

Steps S30 and S40 may be interchanged or performed simultaneously.

Figure 5:
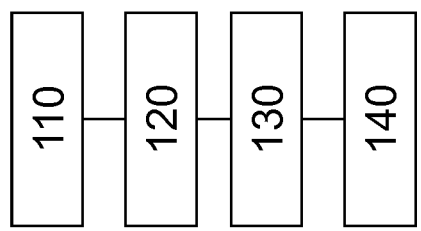
FIG. 5 shows an apparatus according to an embodiment of the invention.
Figure 6:
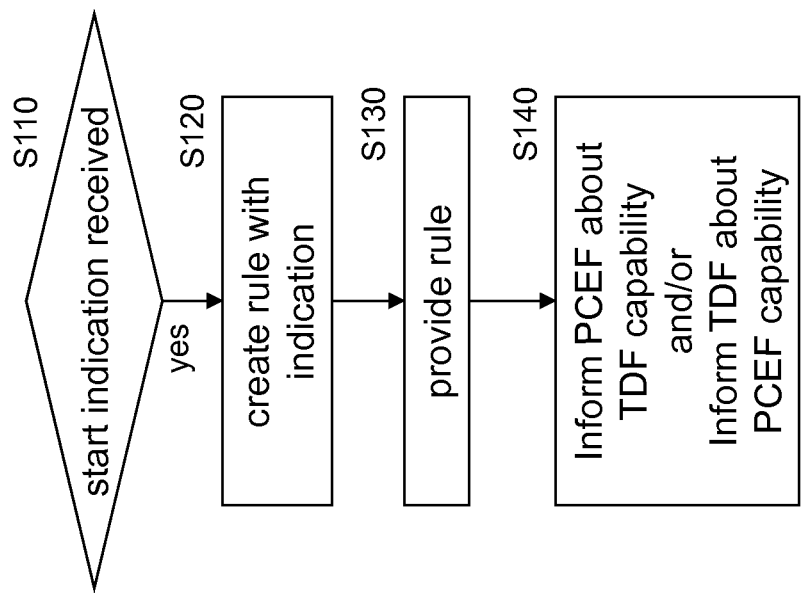
FIG. 6 shows a method according to an embodiment of the invention.

FIG. 5 shows an apparatus according to an embodiment of the invention. The apparatus may be a rules function such as a PCRF. FIG. 6 shows a method according to an embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises detecting means 110, creating means 120, rule providing means 130, and informing means 140.

If the detecting means 110 detects that a start indication is received from a detection device such as a TDF (S110) the creating means 120 creates a rule related to the charging and/or policy control of the application for which the start indication is received (S120). More in detail, the rule may comprise an indication which kind of charging information/records is to be generated. The rule providing means 130 provides the rule to an enforcement device such as a PCEF different from the detection device (S130).

The informing means 140 may inform the enforcement device about a charging capability of the detection device and/or the informing means 140 may inform the detection device about a charging capability of the enforcement device (S140). The information of the charging capabilities is received from the respective device (enforcement device and detection device, respectively). The charging capabilities are related to the application, i.e. to the capability to support application based charging by the detection device, and correspond to each other.

The sequence of steps S120, S130, and S140 is arbitrary provided S120 is performed prior to S130. Some of the steps may be performed simultaneously.

Figure 7:
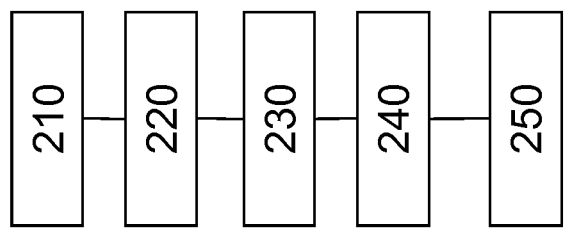
FIG. 7 shows an apparatus according to an embodiment of the invention.

FIG. 7 shows an apparatus according to an embodiment of the invention. The apparatus may be an enforcement function such as a PCEF. FIG. 8 shows a method according to an embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises enforcing means 210, generating means 220, providing means 230, preventing means 240, and informing means 250.

The enforcing means 210 enforces a rule received from a rules function device (such as a PCRF) upon an application (S210). The generating means 220 generates charging information related to the application (S220). For example, the charging information may be related to the start and/or the stop of the application. The providing means 230 provides the generated charging information to a charging device such as an OCS or OFCS (S230).

The preventing means 240 may prevent the generating means 220 from generating the charging information (S240). In addition or alternatively, the preventing means 240 may prevent the providing means 230 from providing the charging information (S240).

The informing means 250 informs the rules function device about an enforcement charging capability of the apparatus (S250). In detail, the enforcement charging capability may comprise an indication that the apparatus comprises the preventing means 240. Insofar, the enforcement charging capability may also be designated as a suppressing capability or preventing capability.

The sequence of steps S210, S220/S230 or S240, and S250 may be arbitrary, some steps may be performed simultaneously.

Figure 9:
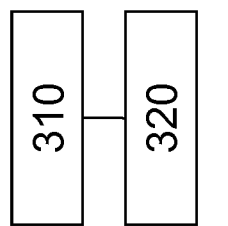
FIG. 9 shows an apparatus according to an embodiment of the invention.

FIG. 9 shows an apparatus according to an embodiment of the invention. The apparatus may be a charging system such as a OCS or OFCS. FIG. 10 shows a method according to an embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises correlating means 310 and providing means 320.

The correlating means 310 correlates charging information received from an enforcement device such as a PCEF and charging information received from a detection device such as a TDF which is different from the enforcement device, wherein both charging information are related to a same application (S310). Thus, correlated charging information is obtained. In the correlating, a hint received from the detection device is used. The hint indicates if the enforcement charging information corresponds to the detection charging information. For example, if the information corresponds to each other, one of the information may be omitted, or the more reliable information may be selected.

The providing means 320 provides the correlated charging information for charging the application (S320).

Embodiments of the invention are described based on an evolved Packet Core system but embodiments of the invention may be applied to other core networks where corresponding functions are employed. An example of another network is a fixed broadband network, wherein the enforcement function may be in an access gateway and the traffic detection function in a separate network entity. Further examples are a fixed broadband access to (services provided by) a mobile core network and a mobile access to (services provided by) a fixed core network, wherein the enforcement function and traffic detection function are separate entities.

The charging system may be an online charging system (OCS) or an offline charging system (OFCS).

According to some embodiments, in order to ensure backward compatibility, receiving an indication that a capability is not supported is equivalent to not receiving any indication about the supported capability.

Embodiments of the invention are described with respect to one application. According to some embodiments, more than one application may be supported by the respective entities.

If not otherwise stated or otherwise made clear from the context, the statement that two entities are different means that they are differently addressed in the core network. It does not necessarily mean that they are based on different hardware. That is, each of the entities described in the present description may be based on a different hardware, or some or all of the entities may be based on the same hardware.

According to the above description, it should thus be apparent that exemplary embodiments of the present invention provide, for example a detection device such as a traffic detection function, or a component thereof, an apparatus embodying the same, a method for controlling and/or operating the same, and computer program(s) controlling and/or operating the same as well as mediums carrying such computer program(s) and forming computer program product(s). Furthermore, it should thus be apparent that exemplary embodiments of the present invention provide, for example a rules function such as a policy and charging rules function, or a component thereof, an apparatus embodying the same, a method for controlling and/or operating the same, and computer program(s) controlling and/or operating the same as well as mediums carrying such computer program(s) and forming computer program product(s). Furthermore, it should thus be apparent that exemplary embodiments of the present invention provide, for example an enforcement function such as a policy and charging enforcement function, or a component thereof, an apparatus embodying the same, a method for controlling and/or operating the same, and computer program(s) controlling and/or operating the same as well as mediums carrying such computer program(s) and forming computer program product(s). Still furthermore, it should thus be apparent that exemplary embodiments of the present invention provide, for example a charging system such as an online charging system or an offline charging system, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
   informing means adapted to inform, upon an internet protocol connectivity access network (IP-CAN) session establishment, a rules function device about support of a charging functionality of the apparatus, wherein the charging functionality indicates that the apparatus comprises generating means adapted to generate a first charging information related to an application;
   detecting means adapted to detect a start of the application;
   indicating means adapted to indicate the start of the application to the rules function device;
   generating means adapted to generate the first charging information related to the application;
   providing means adapted to provide the first charging information to a charging device; and checking means adapted to check if an information about support of charging functionality of an enforcement function received from the rules function device indicates that the enforcement function prevents generating and/or providing of second charging information, wherein the second charging information corresponds to the first charging information.

2. An apparatus, comprising:
informing means adapted to inform, upon an internet protocol connectivity access network (IP-CAN) session establishment, a rules function device about support of a charging functionality of the apparatus, wherein the charging functionality indicates that the apparatus comprises generating means adapted to generate a first charging information related to an application;
detecting means adapted to detect a start of the application;
indicating means adapted to indicate the start of the application to the rules function device;
generating means adapted to generate the first charging information related to the application;
providing means adapted to provide the first charging information to a charging device;
checking means adapted to check if an information about support of charging functionality of an enforcement function received from the rules function device indicates that the enforcement function prevents generating and/or providing of second charging information, wherein the second charging information corresponds to the first charging information; and
hinting means adapted to give, if the checking by the checking means is not affirmative, a hint to the charging device that the charging device may receive the second charging information and the first charging information.

3. The apparatus according to claim 1, wherein
the generating means is adapted to include, in the first charging information, a session information received from the rules function device with respect to the application.

4. An apparatus, comprising:
detecting means adapted to detect if a start indication is received from a detection device, wherein the start indication indicates that an application is started;
creating means adapted to create, if it is detected that the start indication is received, a rule related to charging of the application;
rule providing means adapted to provide the rule to an enforcement device different from the detection device;
informing means adapted to inform, upon an internet protocol connectivity access network (IP-CAN) session establishment, the enforcement device about support of a charging functionality of the detection device and/or to inform the detection device about support of a charging functionality of the enforcement device, wherein an information about the support of the charging functionality of the device is received from the detection device and an information about the support of the charging functionality of the enforcement device is received from the enforcement device, and the information about the support of the charging functionality of the enforcement device and the information about the support of the charging functionality of the device are related to the application and correspond to each other; and
checking means adapted to check if the following two conditions are fulfilled:
a) the charging functionality of the enforcement device indicates that the enforcement device supports preventing generating and/or providing of charging information, and
b) the charging functionality of the detection device indicates that generating of charging information is supported by the detection device;
wherein
the creating means is adapted to create, if the checking by the checking means is affirmative, the rule such that the rule comprises an indication that the detection device creates the charging information; and
the apparatus comprises distributing means adapted to distribute, to the detection device, if the checking by the checking means is not affirmative, a charging relevant information comprised in the rule.

5. The apparatus according to claim 4, further comprising:
reporting means adapted to report, to the detection device, a session on which the application is based.

6. An apparatus, comprising:
enforcing means adapted to enforce a rule received from a rules function device upon an application;
generating means adapted to generate first charging information related to the application;
providing means adapted to provide the first charging information to a charging device;
preventing means adapted to prevent at least one of the generating means from generating the first charging information and the providing means from providing the first charging information;
informing means adapted to inform, upon an internet protocol connectivity access network (IP-CAN) session establishment, the rules function device about support of a charging functionality of the apparatus, wherein the charging functionality indicates that the preventing means of the apparatus are adapted to prevent at least one of the generating means from generating the first charging information and the providing means from providing the first charging information; and
checking means adapted to check if the rules function device provides an indication that a detection device generates second charging information corresponding to the first charging information; wherein
the preventing means is adapted to prevent the at least one of the generating means and the providing means from generating and providing, respectively, if the checking by the checking means is affirmative.

7. The apparatus according to claim 6, wherein
the checking means is adapted to check if the rule comprises the indication.

8. An apparatus, comprising:
correlating means adapted to correlate a first charging information received from an enforcement device and a second charging information received from a detection device different from the enforcement device to obtain a correlated charging information, wherein the first charging information and the second charging information are both related to an application;
a hint received from the detection device is used in the correlating, wherein the hint indicates if the first charging information corresponds to the second charging information; and
providing means adapted to provide the correlated charging information for charging the application.

9. A method, comprising:
informing, upon an internet protocol connectivity access network (IP-CAN) session establishment, a rules function device about support of a charging functionality, wherein the charging functionality indicates a capability of application based charging of an application;

detecting a start of the application;

indicating the start of the application to the rules function device;

generating first charging information related to the application;

providing the first charging information to a charging device; and checking if an information about support of a charging functionality of an enforcement device received from the rules function device indicates that the enforcement function prevents generating and/or providing of second charging information, wherein the second charging information corresponds to the first charging information.

10. A method, comprising:

informing, upon an internet protocol connectivity access network (IP-CAN) session establishment, a rules function device about support of a charging functionality, wherein the charging functionality indicates a capability of application based charging of an application;

detecting a start of the application;

indicating the start of the application to the rules function device;

generating first charging information related to the application;

providing the first charging information to a charging device;

checking if an information about support of a charging functionality of an enforcement device received from the rules function device indicates that the enforcement function prevents generating and/or providing of second charging information, wherein the second charging information corresponds to the first charging information; and giving, if the checking is not affirmative, a hint to the charging device that the charging device may receive the second charging information and the first charging information.

11. The method according to claim 9, wherein the generating is adapted to include, in the first charging information, a session information received from the rules function device with respect to the application.

12. A method, comprising:

detecting if a start indication is received from a detection device, wherein the start indication indicates that an application is started;

creating, if it is detected that the start indication is received, a rule related to charging of the application;

providing the rule to an enforcement device different from the detection device;

informing, upon an internet protocol connectivity access network (IP-CAN) session establishment, the enforcement device about support of a charging functionality of the detection device and/or informing the detection device support of a charging functionality of the enforcement device, wherein an information about the support of the charging functionality of the detection device is received from the detection device and an information about the support of the charging functionality of the enforcement device is received from the enforcement device, and the information about the support of the charging functionality of the enforcement device and the information about the support of the charging functionality of the detection device are related to the application and correspond to each other; and checking if the following two conditions are fulfilled:
a) the charging functionality of the enforcement device indicates that the enforcement device supports preventing a generating and/or providing of charging information, and
b) the charging functionality of the detection device indicates that generating of charging information is supported by the detection device; wherein the rule is created, if the checking by the checking is affirmative, such that the rule comprises an indication that the detection device creates the charging information; and the method comprises distributing, to the detection device if the checking is not affirmative, a charging relevant information comprised in the rule.

13. The method according to claim 12, further comprising:

reporting, to the detection device, a session on which the application is based.

14. A method, comprising:

enforcing a rule received from a rules function device upon an application;

generating first charging information related to the application;

providing the first charging information to a charging device;

preventing at least one of the generating of the first charging information and the providing of the first charging information;

informing, upon an internet protocol connectivity access network (IP-CAN) session establishment, the rules function device about support of a charging functionality, wherein the charging functionality indicates a capability of the preventing that prevents at least one of the generating of the first charging information and the providing of the first charging information; and checking if the rules function device provides an indication that a detection device generates second charging information corresponding to the first charging information;

wherein the at least one of the providing and the generating is prevented if the checking is affirmative.

15. The method according to claim 14, wherein the checking comprises checking if the rule comprises the indication.

16. A method, comprising:

correlating a first charging information received from an enforcement device and a second charging information received from a detection device different from the enforcement device to obtain a correlated charging information, wherein the first charging information and the second charging information are both related to an application;

a hint received from the detection device is used in the correlating; and the hint indicates if the first charging information corresponds to the second charging information; and providing the correlated charging information for charging the application.

17. A computer program product embodied on a non-transitory computer-readable medium comprising a set of instructions which, when executed on an apparatus, is configured to cause the apparatus to carry out the method according to claim 9.

* * * * *